United States Patent
Chen et al.

(10) Patent No.: US 6,598,278 B2
(45) Date of Patent: Jul. 29, 2003

(54) SPONGE SLEEVE INSTALLATION APPLIANCE

(75) Inventors: Ting-Kou Chen, Tainan (TW); Yong-Sen Liao, Miaoli (TW); Yi-Yuan Chen, Hsinchu (TW); Chi-Yeh Huang, Taichung (TW); Shih-Lin Chen, Taichung (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 09/954,706

(22) Filed: Sep. 17, 2001

(65) Prior Publication Data

US 2002/0035771 A1 Mar. 28, 2002

(30) Foreign Application Priority Data

Sep. 25, 2000 (TW) ........................................ 89119701 A

(51) Int. Cl.[7] ................................................. B23P 19/02
(52) U.S. Cl. ................................ 29/235; 29/525; 34/58
(58) Field of Search ........................ 29/235, 446, 525; 134/900; 34/58; 285/346; 15/230

(56) References Cited

U.S. PATENT DOCUMENTS

| 2,616,281 | A | * | 11/1952 | Calhoun | 69/19 |
| 2,794,265 | A | * | 6/1957 | Kruger | 34/58 |
| 2,913,752 | A | * | 11/1959 | Boyles | 15/230 |
| 5,487,399 | A | * | 1/1996 | Hannah | 134/138 |
| 5,621,979 | A | * | 4/1997 | Taylor | 34/58 |
| 5,784,798 | A | * | 7/1998 | Taylor | 34/58 |

FOREIGN PATENT DOCUMENTS

TW  88206919  5/1988

OTHER PUBLICATIONS

English Translation of the Abstract of TW 88206919 Dated May 1988.

* cited by examiner

Primary Examiner—Joseph J. Hail, III
Assistant Examiner—Daniel Shanley
(74) Attorney, Agent, or Firm—Ladas & Parry

(57) ABSTRACT

A sponge sleeve installation appliance for installing a sponge sleeve onto a roller has an elongated socket body including a sleeve portion and a tapered portion. The sleeve portion has an outer circular diameter slightly larger than an inner diameter of the sponge sleeve which when not deformed defines an interior space for accommodating at least part of the roller inserted from a bottom of the sleeve portion. The tapered portion has a cone shape with a bottom connected to a top of the sleeve portion which protrudes and tapers off from the sleeve portion in a longitudinal direction of the sleeve portion.

10 Claims, 4 Drawing Sheets

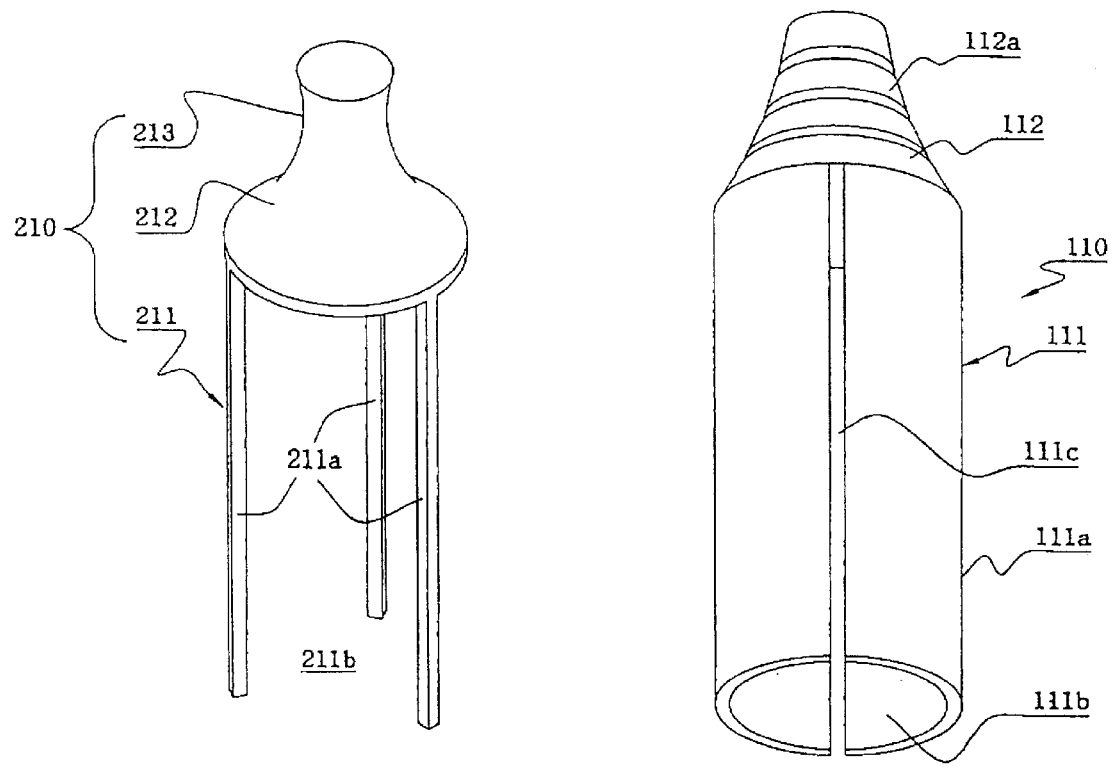
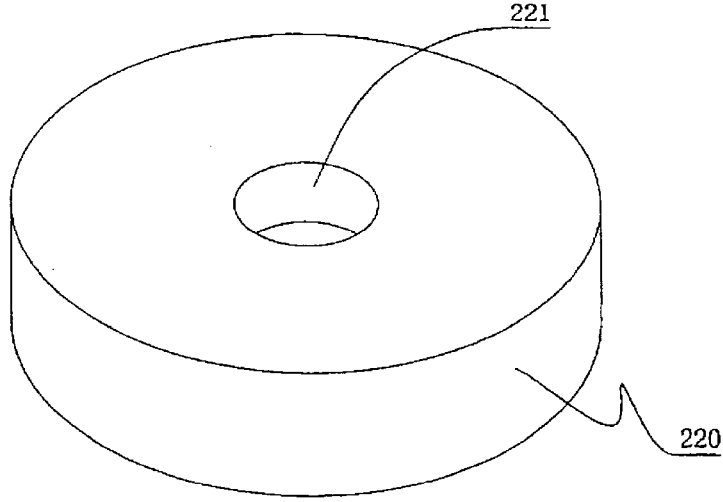
FIG. 1
FIG. 2

SPONGE SLEEVE INSTALLATION APPLIANCE

BACKGROUND OF THE INVENTION

1. Field of the Invention

The present invention relates to a sponge sleeve installation appliance for installing a sponge sleeve onto a roller. Particularly, this invention relates to a sponge sleeve installation appliance making the installation of a sponge sleeve on a roller much easier, the roller being installed in a CMP (Chemical Machine Polish) machine to wash a wafer.

2. Description of the Related Art

During a semiconductor manufacturing process, the process of CMP is widely used to polish the surface of a semiconductor layer. After polishing, the surface of the semiconductor layer must be cleaned before proceeding to the next step. A so-called "washing roller" is used for the washing. The washing roller mainly comprises a roller and a sponge sleeve surrounding the outer circumferential surface of the roller so that the sponge sleeve can be driven to rotate and clean the surface of a wafer. The material of the sponge sleeve is generally made of polyvinyl alcohol (PVA). However, such a material has a certain lifetime. In the past, the washing roller is wholly replaced when the sponge sleeve is worn out. However, the roller is still in good condition. If only the sponge sleeve is required to be replaced, that is going to be cost saving and environmental-protection-led. However, the installation of the sponge sleeve on the roller is quite difficult.

The inventor once found in the market an appliance for installing a sponge sleeve onto a roller. The conventional appliance comprises a chassis having two separate holders. One of the holders is slidable and used to clamp the roller, the other is used to hold a hollow cylinder steel net for bearing the sponge sleeve. When such an appliance is in operation, a bevel head is attached at the front end of the roller and the roller will be moved forward and inserted into the hollow net. Subsequently, the net and the sponge sleeve will be urged to expand by the bevel head and the roller in order to let the roller insert thereinto. Detaching from the holder, the roller could pass through the cylinder net and wear the sponge sleeve. However, such a conventional appliance is expansive, space-occupying and lacking mobility, and thus it is not suitable for the installation of the sponge sleeve on site.

BRIEF SUMMARY OF THE INVENTION

A main object of the present invention is to provide a simple, inexpensive sponge sleeve installation appliance that is easy to install and has a high mobility in operation.

A further object of the present invention is to provide a sponge sleeve installation appliance that can have the sponge sleeve replaced at any place at a high efficiency.

To achieve the above objects, this invention discloses a sponge sleeve installation appliance for installing a sponge sleeve onto a roller, which comprises a longitudinal socket body including a sleeve portion and a tapered portion, the sleeve portion being of an outer circular diameter slightly larger than the inner diameter of the sponge sleeve which is not deformed and defining an interior space for accommodating at least part of the roller which can be inserted from the bottom of the sleeve portion, and the tapered portion being in a cone shape whose bottom is connected to the top of the sleeve portion protruding and tapering off from the sleeve portion in the longitudinal direction of the sleeve portion.

With the above structure, the sponge sleeve installation appliance will be of high mobility and easy installation as it is simple, inexpensive and easy to operate.

In a preferred embodiment, the appliance further comprises a base for bearing the roller. By means of the base, the installation of the sponge sleeve is easier.

In a further preferred embodiment, the socket body further including a grip portion whose bottom is connected to the top of the tapered portion protrudes from the tapered portion in the longitudinal direction of the sleeve portion. Thus, the socket body is easier to be drawn out the roller.

The above and the other objects, features, and advantages of this invention will become clearer in light of the following description of embodiments in reference to the following drawings.

BRIEF DESCRIPTION OF THE DRAWINGS

FIG. 1 is a perspective view of a sponge sleeve installation appliance according to a first embodiment of this invention.

FIG. 2 is a perspective view of a sponge sleeve installation appliance according to a second embodiment of this invention.

DETAILED DESCRIPTION OF THE INVENTION

In the following, a sponge sleeve installation appliance according to this invention will be described in reference to the drawings.

Figure 4A:
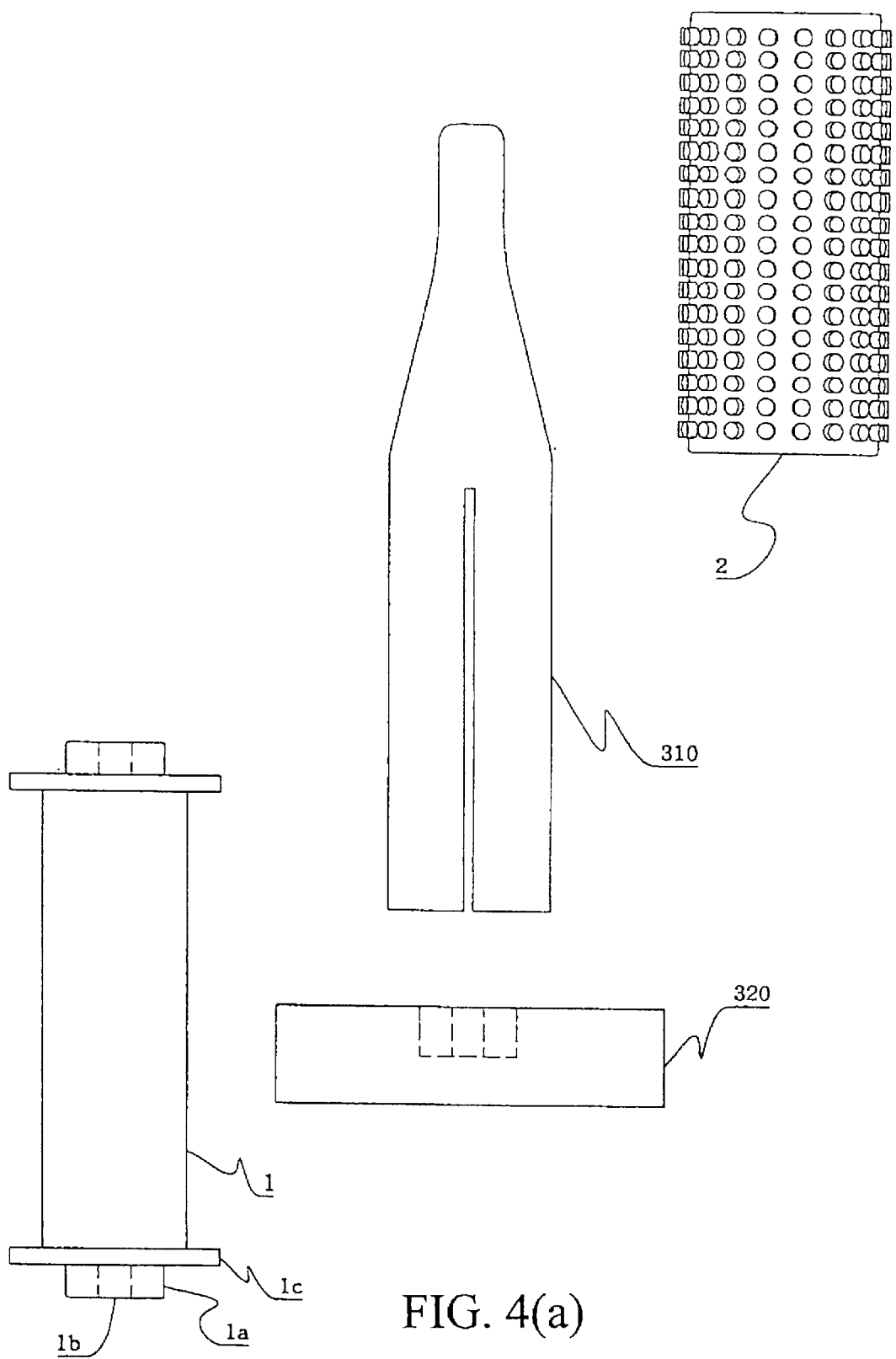
FIGS. 4a~4d respectively show a number of statuses of the installation of the sponge sleeve on the roller with the aid of the sponge sleeve installation appliance of this invention.

The sponge sleeve installation appliance of this invention is suitable for installing a sponge sleeve 2 on a roller 1, as shown in FIG. 4a. The roller 1 is in a shape of a cylinder, and is provided with a stud 1a at each one end thereof. Each stud 1a is formed with a hole 1b opening outward for the insertion and actuation of a driving shaft (not shown). The sponge sleeve 2 is in a shape of a hollow cylinder. The inner diameter of the sponge sleeve 2 of an which is not deformed is slightly smaller than the outer diameter of the roller 1 so that the sponge sleeve 2 can tightly fit onto the roller 1.

FIG. 1 shows a sponge sleeve installation appliance according to a first embodiment of this invention. In this first embodiment, the sponge sleeve installation appliance comprises only an elongated socket body 110. The socket body 110 comprises a sleeve portion 111 and a tapered portion 112. The sleeve portion 111 and the tapered portion 112 are integrally formed and longitudinally continued. The socket body 110 is preferably made of TEFLON or coated with a layer of TEFLON on the outer surface of the sleeve portion 111 of the socket body 110. Accordingly, TEFLON is mainly composed of tetra-fluoro-ethylene (PTFE) or The sleeve portion 111 is constructed with two half-circle shells 111a and has an insertion end for the insertion of the roller 1. The sleeve portion 111 has an interior space 111b for accommodating the roller 1. The outer diameter of the sleeve portion 111 is slightly larger than the inner diameter of the sponge sleeve 2 which is not deformed. At least one slit 111c is formed in the sleeve portion 111. According to this embodiment, two slits 111c are oppositely and longitudinally formed in the sleeve portion 111 from the bottom of the sleeve portion 111 to nearly the tapered portion 112. The length of the sleeve portion 111 is slightly shorter than that of the roller 1.

In other words, the longitudinal length of the interior space 111b is slightly shorter than the length of the roller 1 so that a part of the roller 1 could expose outside of the bottom of the sleeve portion 111 when the roller 1 is inserted into the interior space 111b up to the end. Later on, the exposed portion of the roller 1 could contact the sponge sleeve 2 when the sponge sleeve 2 is completely slipped onto the sleeve portion 111. The slits 111c will have the functions of exhausting the air in the interior space when the roller is inserted thereinto and that of providing the sleeve portion 111 with an expansive flexibility for an easier insertion and draw of the roller 1. However, the socket body 110 could be made of steel net and the slits 111c could be omitted in this case.

The tapered portion 112 protrudes and tapers off from the sleeve portion 111 in the longitudinal direction of the sleeve portion 111. On the outer surface of the tapered portion 112, a number of grooves or ridges 112a are circularly formed so that the socket body 110 is easily griped.

FIG. 2 shows a perspective view of a sponge sleeve installation appliance according a second embodiment of this invention. In this embodiment, the sponge sleeve installation appliance comprises a socket body 210 and a base 220. The socket body 210 includes a sleeve portion 211, a tapered portion 212 and a grip portion 213, which are connected in a series along their longitudinal directions.

The base 220 is in a shape of a flat cylinder and is formed with a recess 221 on its upper side for receiving the stud 1a of the roller 1.

The sleeve portion 211 is constructed by three legs 211a, each extending in parallel from the tapered portion 212 for accommodating the roller 1. An outside contact circle of the three legs 211a has a diameter substantially equal to or slightly larger than the diameter of the sponge sleeve 2. The three less 211a define an interior space 211b for accommodating the roller 1.

The tapered portion 212 has a larger end smoothly connecting with the three legs 211a and a smaller end connecting with the grip portion 213.

The grip portion 213 is in a shape of a knob and slightly expands from the smaller end of the tapered portion 212 toward a head end. The diameter of the head end of the grip portion 213 is smaller than that of the larger end of the tapered portion 212 so that the sponge sleeve 2 could pass over the grip portion 213 to the tapered portion 212 before it slips onto the sleeve portion 211.

Figure 3:
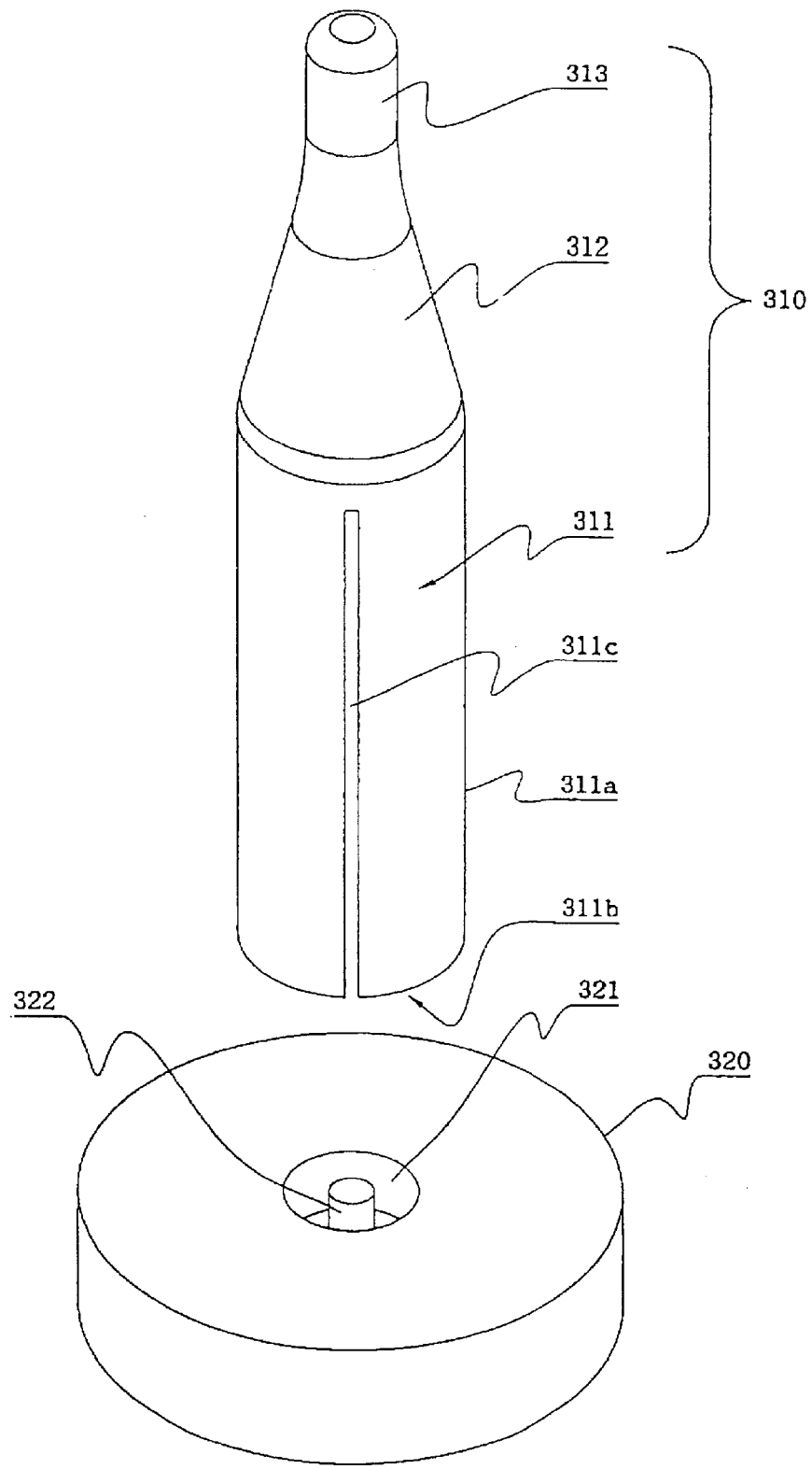
FIG. 3 is a perspective view of a sponge sleeve installation appliance according to a third embodiment of this invention.

FIG. 3 shows a perspective view of a sponge sleeve installation appliance according to a third embodiment of this invention. In this embodiment, the appliance comprises an elongated socket body 310 and a disk shaped base 320. The socket body 310 includes a sleeve portion 311, a tapered portion 312 and a grip portion 313.

The base 320 is in a shape of a flat cylinder and has a recess 321 of an upward opening for receiving and holding the stud 1a of the roller 1. Inside the recess 321, a pin 322 is centrally provided so as to insert into the hole of the stud 1a. Thus, the roller 1 could more stably stand up on the base 320.

The sleeve portion 311 has a construction like the sleeve portion 111 in the first embodiment has, and thus its details are omitted here. In brief, the sleeve portion 311 is constructed by two half-circle shells 311a and formed with two slits 311c. The two shells 311a internally define a receiving space 311b.

The tapered portion 312 protrudes and tapers off from the sleeve portion 111 in the longitudinal direction of the sleeve portion 311 and thus has a larger end as well as a smaller end far away from the bottom of the sleeve portion. The outer surface of the tapered portion 312 is smoothly connected to 311.

The grip portion 313 is in a shape of a cylinder, which has a diameter substantially the same as that of the smaller end of the tapered portion.

FIGS. 4a~4d show the respective statuses of using the installation appliance of this invention to install the sponge sleeve 2, which is illustrated according to the third embodiment of this invention.

As shown in FIG. 4a, a sponge sleeve 2, a bare roller 1 to bear the sponge sleeve 2, and a socket body 310 for installing the sponge sleeve 2, as well as the base 320 is provided. The roller 1 is provided with a stud 1a and a collar 1c at each end thereof. The collar 1c is removable and is used to prevent the sponge sleeve from slipping after it is slipped onto the roller 1.

Figure 4B:
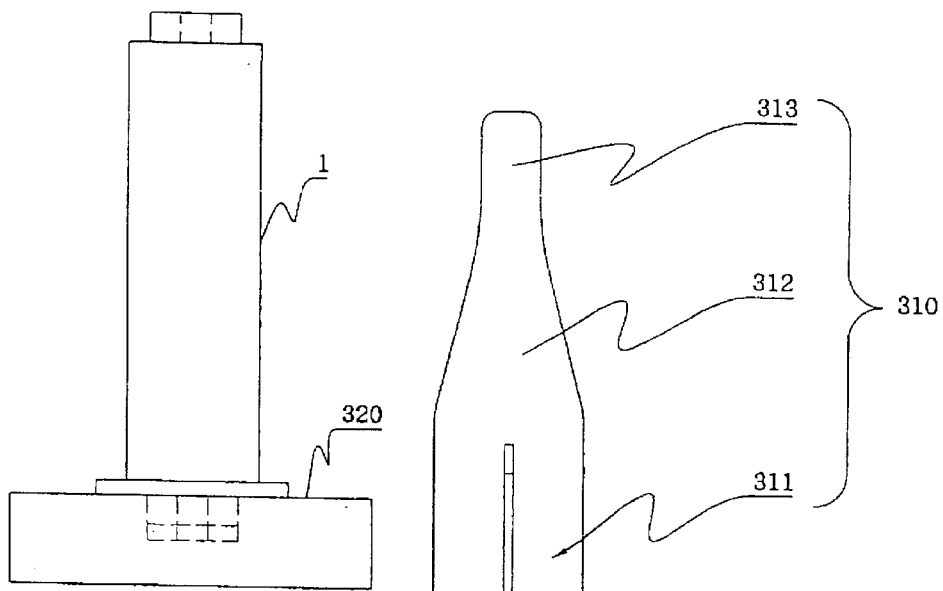

Subsequently, as shown in FIG. 4b, the upper collar 1c of the roller 1 is removed and the roller 1 is rested on the base 320 with the insertion of the stud 1a into the recess 321 of the base 320. In contrast to the first embodiment, the step of resting the roller 1 on the base 320 could be omitted, but instead of this, the roller 1 is held by hand.

Figure 4C:
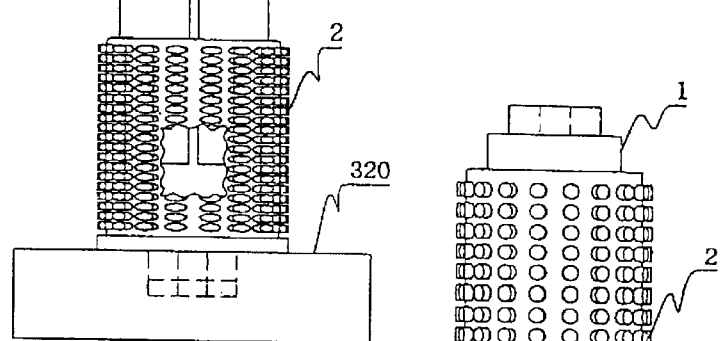

Next, as shown in FIG. 4c, the sleeve portion 311 is slipped onto the roller 1. In the meanwhile, since the interior space 311b has a diameter substantially equal to or slightly larger than that of the roller 1, and the socket body 310 is rigid, the roller 1 is easily inserted into the sleeve portion 311. On the other hand, since the length of the sleeve portion 311 is shorter than that of the roller 1, the bottom portion of the roller 1 will expose outside the sleeve portion 311. Continuously, the sponge sleeve 2 is slipped over the grip portion 313 and onto the sleeve portion 311 or onto the bottom portion of the sleeve portion 311 via the tapered portion 312.

Figure 4D:
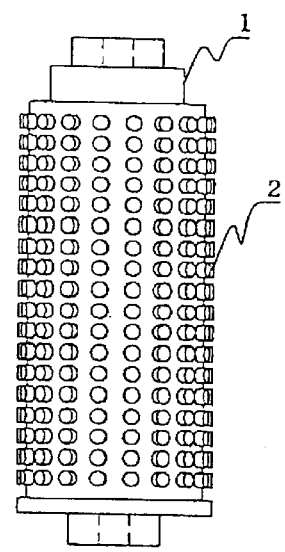

Lastly, once the sponge sleeve 2 is completely slipped onto the sleeve portion 311, preferably onto the bottom portion of the sleeve portion 311, the operator on one hand could fix the bottom portion of the sponge sleeve 2 onto the bottom portion of the roller 1 which is not covered by the sleeve portion 311, and on the other hand could grip the grip portion 313 upward so as to draw the socket body 310 out of the roller 1. Along with the moving up of the socket body 310, the sponge sleeve 2 will also move up. Thus, when the upper end of the sponge sleeve 2 is at a level the same with the upper end of the roller 1, the operator can stop the moving of the sponge sleeve, and remove the socket body 310 therefrom. As a result, the sponge sleeve 2 is slipped onto the roller 1 as shown in FIG. 4d. Continuously, the collar 1c is attached onto the roller 1 and the installation of the sponge sleeve 2 is completed.

As mentioned in the above, the sponge sleeve installation appliance of this invention is simple and easy to use and it is inexpensive and has a high mobility and successful rate. With such an appliance, the cost for maintaining the washing roller could be reduced significantly and the environmental protection could be practiced.

However, the above description is described by way of preferred embodiments, it is understood that the embodiments are used only to illustrate the technical concept of the present invention without limiting the scope thereof. It is therefore intended to show that all modifications and alterations that are readily apparent to those skilled in the art are within the scope as defined in the appended claims.

What is claimed is:

1. In a sponge sleeve installation appliance for installing a sponge sleeve onto a roller, the improvements comprising:

an elongated socket body including a sleeve portion and a tapered portion, wherein the sleeve portion has an outer circular diameter slightly larger than an inner diameter of the sponge sleeve when not deformed to define an interior space for accommodating at least part of the roller inserted from a bottom of the sleeve portion, and wherein the tapered portion has a cone shape with a bottom connected to a top of the sleeve portion and protrudes and tapers off from the sleeve portion in a longitudinal direction of the sleeve portion.

2. The appliance as claimed in claim 1, further comprising a base having a recess of an upward opening, and the recess being of a size for receiving a stud provided at one end of the roller.

3. The appliance as claimed in claim 2, wherein the stud includes a hole for being connected to a driving shaft.

4. The appliance as claimed in claim 3, wherein the base possesses a pin centrally positioned in the recess to match the hole of the stud.

5. The appliance as claimed in claim 1, wherein the longitudinal length of the interior space is slightly shorter than the length of the roller.

6. The appliance as claimed in claim 1, wherein the sleeve portion is formed with at least one slit extending from the bottom of the sleeve portion to nearly the tapered portion in the longitudinal direction of the sleeve portion.

7. The appliance as claimed in claim 1, wherein the socket body further comprises a grip portion whose bottom is connected to the top of the tapered portion protrudes from the taper portion in the longitudinal direction of the sleeve portion.

8. The appliance as claimed in claim 1, wherein the tapered portion has an outer surface with a number of circularly extending grooves.

9. The appliance as claimed in claim 1, wherein the socket body is made from at least one of tetra-fluoro-ethylene and perfluoro-alkoxy.

10. The appliance as claimed in claim 1, wherein the outer surface of the sleeve portion of the socket body is coated with a layer including at least one of tetra-fluoro-ethylene and perfluoro-alkoxy.

* * * * *